Patented May 1, 1951

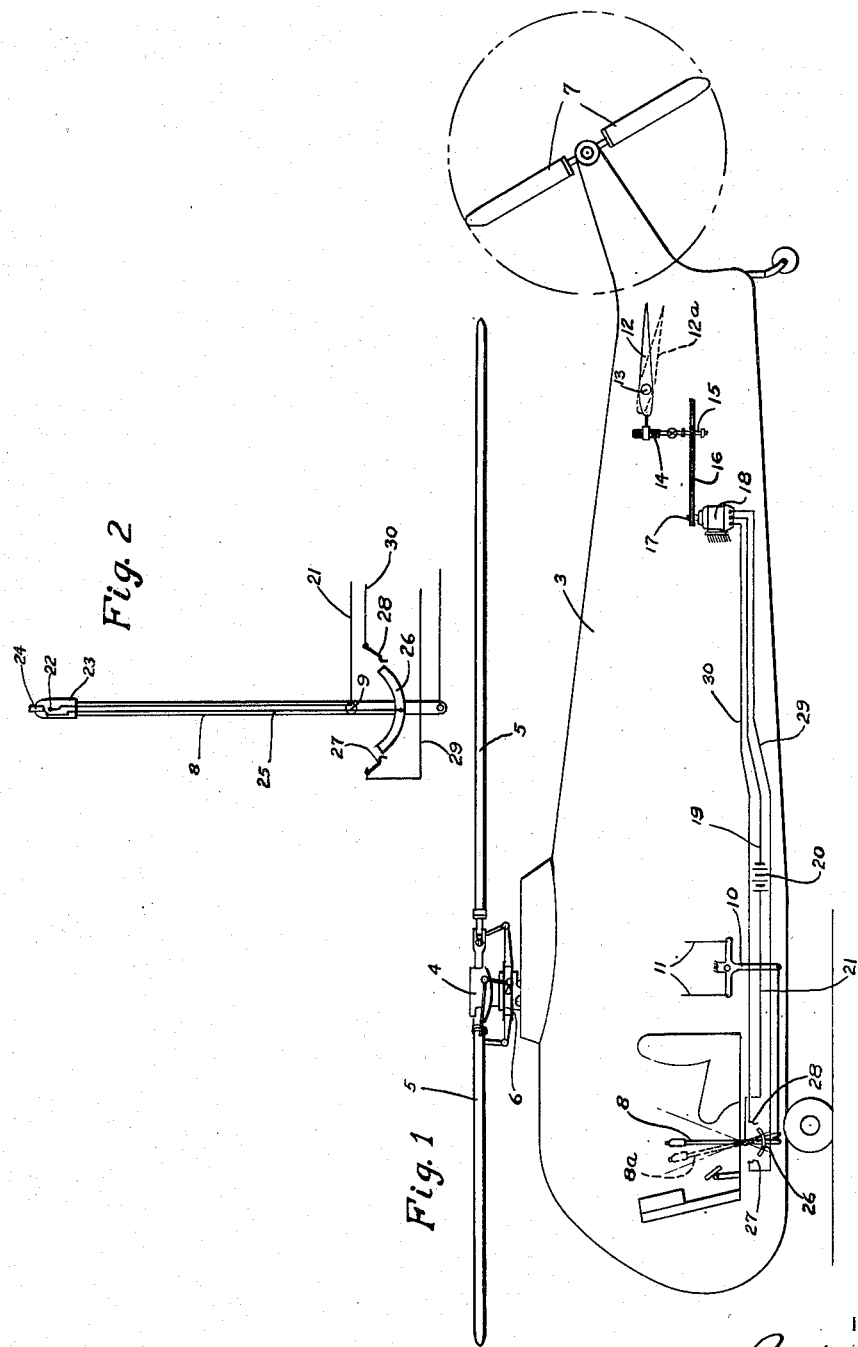

2,551,067

UNITED STATES PATENT OFFICE 2,551,067

ADJUSTMENT MECHANISM FOR HELICOPTER STABILIZING SURFACES

Paul H. Stanley, Glenside, Pa., assignor to Autogiro Company of America, Philadelphia, Pa., a corporation of Delaware Application February 27, 1948, Serial No. 11,624

6 Claims. (Cl. 244—17.19)

This invention relates to helicopters and is especially concerned with that type of helicopter having a sustaining rotor of which the lift line is tiltable so as to introduce a horizontal thrust component and thereby effect translational flight of the helicopter.

In a typical helicopter of the type referred to, a single multi-bladed sustaining rotor is utilized, and provision is made for cyclic variation of blade pitch for the purpose of flight control and also for the purpose of setting up a horizontal thrust component. In such an aircraft a control organ, for instance a pivotally mounted control stick is coupled with the rotor blades for pitch control. Fore and aft movement of the control stick acts on the pitch of the rotor blades in such manner as to tilt the rotor lift line in the fore and aft plane. Thus, when it is desired to introduce a horizontal thrust component in the forward direction, the control stick is moved forwardly and the lift line is correspondingly tilted forwardly whereupon translational flight takes place. This same stick movement (forward) is also relied upon in a typical aircraft of the character mentioned to effect a nose-down change in attitude of the aircraft, regardless of whether the aircraft is in translational or hovering flight. In consequence, during translational flight, the range of control stick movement available for setting up nose-down moments is reduced and, in addition, the neutral or mid position of the stick in forward flight is altered (shifted forwardly) as compared with the neutral or mid position when in hovering flight.

With the foregoing in mind, the present invention contemplates the employment of an adjustable stabilizer surface so positioned as to set up moments in the pitching plane, and at the same time the invention provides semi-automatic adjustment mechanism for this stabilizer surface. The adjustment mechanism is arranged to set up a nose-down moment when the control stick is moved forwardly to establish forward translational flight. In this way the neutral or mid position of the stick may always be retained substantially in the same relation to the pilot under various conditions of flight, such as hovering flight and forward translation.

In the preferred embodiment of the invention, the stabilizer adjustment mechanism is actuable by movement of the control stick itself. In the preferred arrangement, moreover, means are provided, also in association with the control stick, for selectively rendering the stabilizer adjustment mechanism effective or ineffective.

How the foregoing and other objects and advantages are attained will appear more fully from the following description referring to the accompanying drawing in which:

Figure 1 is a somewhat diagrammatic side elevational view of a helicopter incorporating the stabilizer control mechanism of the present invention; and Figure 2 is an enlarged somewhat diagrammatic view of certain of the control parts associated with a typical control stick.

The aircraft illustrated by way of example comprises a body 3 having a sustaining rotor comprising a hub 4 to which a plurality (for instance three) rotor blades 5 are pivotally connected. The pivots for each blade preferably include a pivot providing freedom for blade movement in the flapping sense and a pivot providing freedom for pitch change movement of the blade, the pitch being controllable as by means of a swash ring 6 in a manner understood in this art, for instance as described in the copending application of Harris S. Campbell, Serial No. 605,577, filed July 17, 1945.

It will be understood that in the illustrative aircraft shown in Figure 1 the rotor is power driven from an engine carried in the body. Rotor driving torque is compensated for by means of an antitorque rotor 7 arranged toward the tail of the aircraft.

Any suitable manual control organ may be employed for regulation of the cyclic variation of blade pitch angle, for instance a control stick 8 pivotally mounted at 49. This control stick is linked with the bellcrank 10 and operating connections 11 are extended from the bellcrank to the pitch control mechanism at the hub in a manner which need not be considered herein. Movement of the control stick either forwardly or rearwardly of a mid position, for instance the full line position shown in Figure 1, introduces a cyclic variation of blade pitch angle such as to correspondingly tilt the rotor thrust line. The rotor thrust line thus is controllable with reference to the center of gravity of the aircraft as a whole and in this way moments are set up tending to tilt the aircraft in the pitching plane.

Assuming that a take-off has been made vertically and that the aircraft is in hovering flight, with the control stick in neutral position (the full line position of Figure 1), translational flight is initiated by moving the control stick forwardly, for instance to the dotted position 8a. This causes the rotor lift line to tilt forwardly above the rotor and thereby introduces a horizontal thrust component in the forward direction. The aircraft now commences translational flight and assumes a somewhat nose-down attitude. Continuance of this translational flight requires that the control stick be retained in a position displaced somewhat forwardly of the neutral position for hovering flight. Thus, for translational flight, the control stick has assumed a new "neutral" setting with reference to which fore and aft displacements must be made if the longitudinal attitude of the aircraft is to be changed. As a further result, the available range of control stick movement in the forward direction (for effecting normal changes in longitudinal attitude) is diminished. The shifting of the "neutral" stick position as between a condition of hovering flight and a condition of translational flight is confusing to the pilot.

With the foregoing in mind, the present invention contemplates the employment of an adjustable stabilizer such as shown at 12. This stabilizer is offset longitudinally of the aircraft from the rotor axis and is mounted for change in angle of attack about a pivot 13. The angle of attack is adjustable by means of a screw thread device 14 rotatable by means of a shaft 15 carrying a pulley with which a belt 16 cooperates, the belt also cooperating with a pulley on shaft 17 of the reversible motor 18.

The windings of the motor are connected with certain switch control elements associated with the control stick. One motor connection or lead 19 extends to a suitable source of current such as the battery indicated at 20, and from the battery a wire 21 is extended to the control stick and upwardly therethrough to a contact 22 mounted within the hand grip. A cooperating contact operated by a push button 24 is connected by a wire 25 with an arcuate contact member 26 carried by the control stick below the pivot 9. A pair of contact elements 27 and 28 are mounted in position to cooperate with the member 26 upon movement of the control stick. Elements 27 and 28 are coupled with the motor by wires 29 and 30 respectively.

The operation of the system described is as follows:

Assuming again that a vertical take-off has been made and the aircraft is in hovering flight, the pilot may now initiate translational flight and may actuate the push button contact 24 during the forward movement of the control stick. This will complete a motor driving circuit through the contact parts 26 and 28 and thereby operate the motor in a direction to adjust the stabilizer to the position indicated at 12a. As the stabilizer moves toward position 12a, it sets up a nose-down moment which increases gradually during the movement of the stabilizer. The control stick may thus be gradually moved back toward neutral position with the stabilizer moment replacing the nose-down moment from the forward position of the stick. When the control stick reaches the neutral region, the circuit is broken through lack of contact at 28 even though the button 24 may be engaged. Thus the stabilizer automatically reaches proper nose-down position 12a and remains there as long as the stick is retained in neutral. The push button 24 may, of course, be released upon return to neutral position, and while the push button is released the stick may be moved to any desired extent without change in stabilizer position. In this way the full range of control stick movement is available for normal control of longitudinal attitude, notwithstanding the fact that the aircraft is now in translational flight. When changing back to a condition of hovering flight, a similar operation is performed, i. e., the pilot displaces the control stick rearwardly, with the push button 24 depressed, thereby completing a motor circuit through the elements 26 and 27. This operates the motor in the opposite direction and moves the stabilizer surface from a position such as that represented by the dotted showing 12a to a position such as indicated in full lines (or even beyond if desired). Release of push button 24 will then again permit normal use of the control stick for controlling the longitudinal attitude of the aircraft.

It is of importance in the arrangement described that the stabilizer is adjusted by virtue of movement of the control stick itself, and also that the push button control for rendering the adjustment mechanism operative or inoperative is mounted on the hand grip of the control stick, since in this way a single hand of the pilot may readily serve not only for the normal longitudinal attitude control but also for the stabilizer adjustment, leaving the other hand of the pilot free to regulate other controls, such for example as the customary engine throttle control or a control for the mean rotor blade pitch angle.

As illustrated, it is preferred that the contact parts 26, 27 and 28 be arranged so as to provide a small limited range of stick movement in either direction from a neutral position without engaging the arcuate contact 26 with either of the elements 27 or 28. This is of advantage in providing for limited control stick movement such as may be required to maintain a steady position in hovering flight, without engagement of the contacts. This contact spacing also accommodates limited variations in the neutral setting which may arise as a result of longitudinal shift in C. G. location due to differences in loading.

I claim:

1. In an aircraft having a powered sustaining rotor the lift line of which is controllable in a longitudinal sense to regulate longitudinal attitude and translational flight of the aircraft, a pilot operable rotor control organ for longitudinal attitude and flight control, a stabilizer surface adjustable to different angles to vary the longitudinal attitude of the aircraft during translational flight, the said control organ having a mid position of adjustment corresponding to hovering flight in a longitudinally horizontal attitude, control mechanism for regulating the angle of the stabilizer surface, comprising operating elements associated with the said control organ arranged to be activated by said control organ only upon adjustment of the said control organ beyond a limited range of adjustment from the mid position, and a pilot operable device for rendering said mechanism effective or ineffective.

2. In an aircraft having a powered sustaining rotor the lift line of which is controllable in a longitudinal sense to regulate longitudinal attitude and translational flight of the aircraft, a pilot operable rotor control organ for longitudinal attitude and flight control, a stabilizer surface adjustable to different angles to vary the longitudinal attitude of the aircraft during translational flight, the control organ having a mid position of adjustment corresponding to hovering flight in a longitudinally horizontal attitude, control mechanism for regulating the angle of the stabilizer surface comprising reversible operating means and, in electrical circuit therewith, controlling electric contact elements associated with the control organ and operative to reverse the operation of said mechanism upon adjustment of the control organ in opposite senses from said mid position.

3. A construction according to claim 2 and further including a pilot operable device for rendering said mechanism effective or ineffective.

4. A construction according to claim 3 in which said pilot operable device comprises an electric switch physically associated with the control organ to provide for operation of the switch and of the control organ by a single hand of the pilot.

5. In an aircraft having a powered bladed sustaining rotor with pitch control for shifting the lift line longitudinally of the aircraft to regulate the longitudinal attitude of the aircraft, a pilot operable pitch control organ movable in opposite directions from a mid position corresponding to a longitudinally horizontal attitude, an adjustable stabilizer surface for setting up variable moments acting to influence the longitudinal attitude of the aircraft, control mechanism for adjusting said stabilizer responsive to movements of the pilot's pitch control in opposite directions from said mid position, and a pilot operable device for rendering said control mechanism effective or ineffective, physically associated with the pitch control organ to provide for actuation of said device and said pitch control organ by a single hand of the pilot.

6. A construction according to claim 5 in which the said device comprises an electric push button switch mounted on the control organ.

PAUL H. STANLEY.

REFERENCES CITED

The following references are of record in the file of this patent:

FOREIGN PATENTS

| Number | Country | Date |
|--------|---------|------|
| 844,048 | France | Apr. 11, 1939 |